US009258836B2

(12) United States Patent
Fujita

(10) Patent No.: US 9,258,836 B2
(45) Date of Patent: Feb. 9, 2016

(54) INFORMATION PROCESSING APPARATUS, CONTROL METHOD THEREFOR, AND RECORDING MEDIUM

(71) Applicant: CANON KABUSHIKI KAISHA, Tokyo (JP)

(72) Inventor: Shunji Fujita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 61 days.

(21) Appl. No.: 14/141,312

(22) Filed: Dec. 26, 2013

(65) Prior Publication Data

US 2014/0187163 A1 Jul. 3, 2014

(30) Foreign Application Priority Data

Dec. 28, 2012 (JP) ................................. 2012-286682

(51) Int. Cl.
*H04B 5/00* (2006.01)
*H04B 7/00* (2006.01)
*H04W 76/02* (2009.01)
(Continued)

(52) U.S. Cl.
CPC ............ *H04W 76/023* (2013.01); *H04W 4/008* (2013.01); *H04W 36/36* (2013.01); *H04W 84/18* (2013.01)

(58) Field of Classification Search
CPC ... G06K 7/0008; G06K 19/0723; H04B 5/02; H04W 76/02; H04M 1/7253
USPC .............................................. 455/41.1–41.3
See application file for complete search history.

(56) References Cited

U.S. PATENT DOCUMENTS 7,471,200 B2 * 12/2008 Otranen ...................... 340/572.1
8,224,246 B2 * 7/2012 Suumaki et al. ............. 455/41.1
(Continued)

FOREIGN PATENT DOCUMENTS

EP 2445257 A1 4/2012
JP 2011151746 A 8/2011

OTHER PUBLICATIONS

NFC Forum, Connection Handover Technical Specification NFC Forum, Jul. 7, 2010.
(Continued)

*Primary Examiner* — Simon Nguyen
(74) *Attorney, Agent, or Firm* — Canon USA, Inc. I.P. Division

(57) ABSTRACT

An information processing apparatus, for communicating with a communication device using a first wireless communication protocol and a second wireless communication protocol, includes a first wireless communication unit configured to use the first wireless communication protocol and configured to receive information, relating to a start-up state of the communication device, from the communication device using the first wireless communication protocol, a second wireless communication unit configured to use the second wireless communication protocol, and a control unit configured to control a sequence for establishing connection, using the second wireless communication unit and the second wireless communication protocol, with the communication device. The control unit is arranged to change the sequence for establishing connection, using the second wireless communication unit and the second wireless communication protocol, in accordance with the content of the received information relating to the start-up state of the communication device.

16 Claims, 17 Drawing Sheets

(51) Int. Cl.
*H04W 4/00* (2009.01)
*H04W 36/36* (2009.01)
*H04W 84/18* (2009.01)

(56) References Cited

U.S. PATENT DOCUMENTS

| | | | | |
|---|---|---|---|---|
| 8,462,734 | B2* | 6/2013 | Laine et al. | 370/331 |
| 8,627,075 | B2* | 1/2014 | Ikeda et al. | 713/168 |
| 8,971,800 | B2* | 3/2015 | Hillan et al. | 455/41.1 |
| 8,995,908 | B2* | 3/2015 | Pedro et al. | 455/41.1 |
| 2007/0242729 | A1* | 10/2007 | Quinn et al. | 375/130 |
| 2009/0111378 | A1* | 4/2009 | Sheynman et al. | 455/41.1 |
| 2009/0221271 | A1* | 9/2009 | Soma et al. | 455/414.1 |
| 2013/0157566 | A1* | 6/2013 | Oguchi | 455/41.1 |
| 2013/0195271 | A1* | 8/2013 | Miyabayashi et al. | 380/255 |
| 2014/0117921 | A1* | 5/2014 | Suomela | 320/103 |
| 2014/0173686 | A1* | 6/2014 | Kgil et al. | 726/1 |

OTHER PUBLICATIONS

Bluetooth Secure Simple Pairing Using NFC Application Document NFC Forum, Oct. 18, 2011.
Simple NDEF Exchange Protocol Technical Specification NFC Forum, Aug. 31, 2011.

* cited by examiner

A: SSID(16)
B: ENCRYPTION KEY(16)
C: POWER SUPPLY START-UP STATE(1)
D: START-UP AVAILABILITY STATE(1)
Z: NON-USE(30)

FIG. 8

| No | ACQUIRED INFORMATION | | TRANSMISSION CONDITION FOR COMMUNICATION CONNECTION REQUEST | | |
|---|---|---|---|---|---|
| | POWER SUPPLY START-UP STATE | START-UP AVAILABILITY STATE | TRANSMISSION AVAILABILITY | WAITING PERIOD | NUMBER OF RETRIES |
| 1 | 0: ON STATE (NORMAL) | 0: AVAILABLE | YES | 0 SECONDS | 3 |
| 2 | 1: ON STATE (ENERGY-SAVING) | 0: AVAILABLE | YES | 3 SECONDS | 10 |
| 3 | 2: OFF STATE | 0: AVAILABLE | YES | 5 SECONDS | 10 |
| 4 | 2: OFF STATE | 1: NOT AVAILABLE | NO | — | — |

A: SSID(16)
B: ENCRYPTION KEY(16)
C: POWER SUPPLY START-UP STATE(1)
D: START-UP AVAILABILITY STATE(1)
E: START-UP PERIOD(4)
Z: NON-USE(26)

FIG. 13

| No | ACQUIRED INFORMATION | | TRANSMISSION CONDITION FOR COMMUNICATION CONNECTION REQUEST | |
|---|---|---|---|---|
| | START-UP AVAILABILITY STATE | START-UP PERIOD | TRANSMISSION AVAILABILITY | WAITING PERIOD |
| 1 | 0: AVAILABLE | X SECONDS | YES | X SECONDS |
| 2 | 1: NOT AVAILABLE | Y SECONDS | NO | Y SECONDS |

FIG. 17

| No | ACQUIRED INFORMATION | | TRANSMISSION CONDITION FOR COMMUNICATION CONNECTION REQUEST | | | |
|---|---|---|---|---|---|---|
| | POWER SUPPLY START-UP STATE | START-UP AVAILABILITY STATE | TRANSMISSION AVAILABILITY | WAITING PERIOD | NUMBER OF RETRIES | TIMEOUT PERIOD |
| 1 | 0: ON STATE (NORMAL) | 0: AVAILABLE | YES | 0 SECONDS | 3 | 1 SECOND |
| 2 | 1: ON STATE (ENERGY-SAVING) | 0: AVAILABLE | YES | 3 SECONDS | 10 | 3 SECONDS |
| 3 | 2: OFF STATE | 0: AVAILABLE | YES | 5 SECONDS | 10 | 5 SECONDS |
| 4 | 2: OFF STATE | 1: NOT AVAILABLE | NO | — | — | — |

INFORMATION PROCESSING APPARATUS, CONTROL METHOD THEREFOR, AND RECORDING MEDIUM

BACKGROUND OF THE INVENTION

1. Field of the Invention

The present invention relates to a technology for transmitting and receiving information via wireless communication.

2. Description of the Related Art

In recent years, a scheme for setting up communication connections such as wireless local area network (LAN) or Bluetooth (registered trademark) connection with simple operations, called a handover, has been proposed. A handover is a process for switching from a short range communication protocol such as near-field communication (NFC), which devices use to exchange information necessary for authentication, such as configuration information, to a longer range communication protocol such as wireless LAN after such information has been exchanged.

For example, Japanese Patent Laid-Open No. 2011-151746 proposes a technology for implementing switching of communication protocols. In the proposed technology, upon receiving a switch request in a handover attempt, an information terminal determines whether or not it is ready to support a target communication protocol, and, if it is determined that the information terminal is not ready to support the target communication protocol, the information terminal is made ready to support the target communication protocol, thereby implementing the switching to the target communication protocol.

In the technology proposed in Japanese Patent Laid-Open No. 2011-151746, if a communication partner device is not ready to support a target communication protocol, the information terminal is made ready to support the target communication protocol during a handover, thereby realizing the switching to the target communication protocol. However, the switching operation takes a certain amount of time. For example, if a long time is taken for the information terminal to get ready to support the target communication protocol, the information terminal may not be able to receive a response to a communication connection request for a continuous period of time. In this case, some information terminals may determine that the handover has failed if the number of retries exceeds a certain value.

SUMMARY OF THE INVENTION

There is provided an information processing apparatus, for communicating with a communication device using a first wireless communication protocol and a second wireless communication protocol different from the first wireless communication protocol. The information processing apparatus includes a first wireless communication unit configured to use the first wireless communication protocol and configured to receive information, relating to a start-up state of the communication device, from the communication device using the first wireless communication protocol, a second wireless communication unit configured to use the second wireless communication protocol, and a control unit configured to control a sequence for establishing connection, using the second wireless communication unit and the second wireless communication protocol, with the communication device. The control unit is arranged to change the sequence for establishing connection, using the second wireless communication unit and the second wireless communication protocol, in accordance with the content of the received information relating to the start-up state of the communication device.

Further features of the present invention will become apparent from the following description of exemplary embodiments with reference to the attached drawings.

BRIEF DESCRIPTION OF THE DRAWINGS

FIG. 8 is a diagram illustrating an example of a determination table according to the first exemplary embodiment of the present invention.

FIG. 13 is a diagram illustrating an example of a determination table according to the second exemplary embodiment of the present invention.

FIG. 17 is a diagram illustrating an example of a determination table according to another exemplary embodiment of the present invention.

DESCRIPTION OF THE EMBODIMENTS

Some exemplary embodiments of the present invention will be described in detail hereinafter with reference to the accompanying drawings.

First Exemplary Embodiment

A first exemplary embodiment of the present invention will be described hereinafter.

Configuration of Communication Device 100

Figure 1:
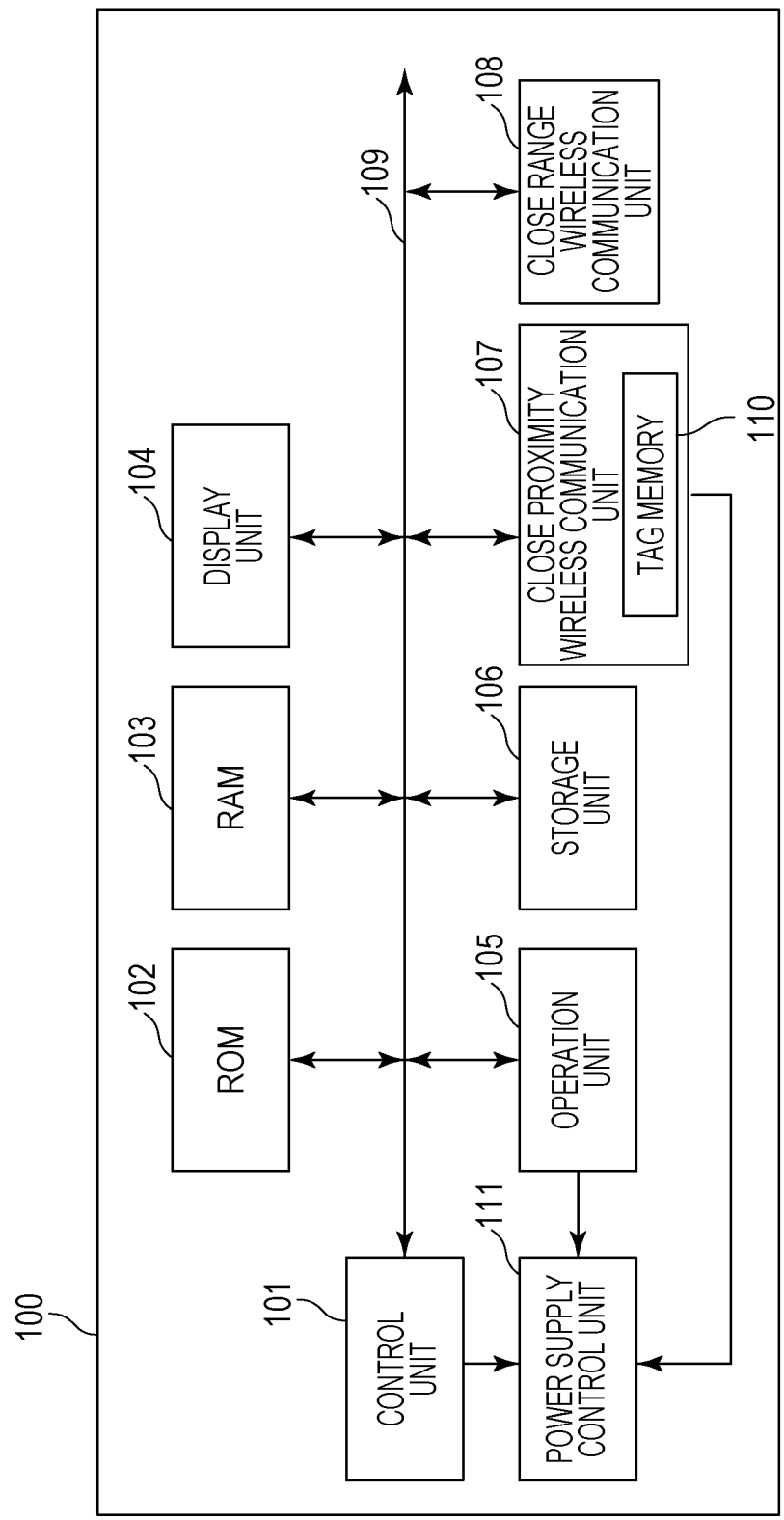
FIG. 1 is a diagram illustrating an example of an internal configuration of a communication device according to a first exemplary embodiment of the present invention.

FIG. 1 is a processing block diagram illustrating an internal configuration of a communication device 100, which is an example of a communication device according to an exemplary embodiment of the present invention. Examples of the communication device may include a mobile phone, a digital camera, a music player, a tablet terminal, a personal computer, and a mobile access point. As illustrated in FIG. 1, the communication device 100 includes a control unit 101, a read-only memory (ROM) 102, a random access memory (RAM) 103, a display unit 104, an operation unit 105, a storage unit 106, a close proximity wireless communication unit 107, a close range wireless communication unit 108, a tag memory 110, and a power supply control unit 111. The control unit 101, the ROM 102, the RAM 103, the display unit 104, the operation unit 105, the storage unit 106, the close proximity wireless communication unit 107, and the close range wireless communication unit 108 are connected to one another via an internal bus 109 serving as a data transmission path. The tag memory 110 is included in the close proximity wireless communication unit 107. The power supply control unit 111 is controlled using the control unit 101, the operation unit 105, and the close proximity wireless communication unit 107.

The control unit 101 is a processing block configured to control the overall operation of the communication device 100, and is formed of, for example, a central processing unit (CPU). The control unit 101 executes a program stored in the ROM 102, thereby implementing various functions.

The ROM 102 is a non-volatile memory, and is a memory configured to store data and a processing program to be executed by the control unit 101.

The RAM 103 is a volatile memory, and is used as a working memory for the control unit 101 or as a temporary data storage area.

The display unit 104 is a processing block configured to display and output information to a user, and may be formed of, for example, a liquid crystal panel, an organic electroluminescent (EL) panel, or the like.

The operation unit 105 is a processing block configured to receive an instruction input from the user, and may include buttons, a cross key, a touch panel, and so forth.

The storage unit 106 is a processing block configured to store and read information in and from a large-capacity recording medium such as a built-in hard disk, a built-in flash memory, or a removable memory card.

The close proximity wireless communication unit 107 is a processing block configured to perform close proximity wireless communication based on the near-field communication (NFC) protocol which uses the 13.56 MHz frequency band. The close proximity wireless communication unit 107 targets a communication distance of 10 cm or less although the communication distance depends on the environment. The close proximity wireless communication unit 107 includes a resonant circuit including an inductor and a capacitor, a demodulation circuit configured to demodulate a signal received by the resonant circuit, a transmission circuit configured to amplify the carrier and transmit the amplified carrier from the resonant circuit, and so forth. The close proximity wireless communication unit 107 also includes the tag memory 110, and has a function, as an NFC card function, to transmit information stored in the tag memory 110 to an external device having an NFC reader/writer function. The function of the close proximity wireless communication unit 107 is an example of an information transmission unit. In this exemplary embodiment, close proximity wireless communication is implemented using NFC. Any other communication protocol such as Infrared Data Association (IrDA) may be used.

Figure 2:
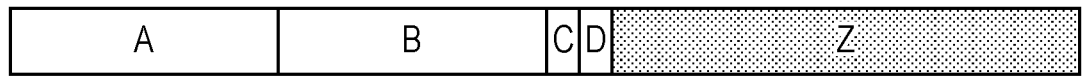
FIG. 2 is a diagram illustrating an example of the data format of a tag memory according to the first exemplary embodiment of the present invention.

FIG. 2 illustrates an example of the data format of the tag memory 110 according to this exemplary embodiment. As illustrated in FIG. 2, the tag memory 110 has a total capacity of 64 bytes, and is configured to store information concerning a service set identifier (SSID) (16 bytes), an encryption key (16 bytes), a power supply start-up state (1 byte), and a start-up availability state (1 byte). The SSID and encryption key are information necessary to connect to a wireless LAN network, which is configured by the close range wireless communication unit 108 described below. The power supply start-up state is information indicating the power supply start-up state of the communication device 100. In this exemplary embodiment, three types of power supply start-up states are defined: "0: On-state (normal mode)", "1: On-state (energy-saving mode)", and "2: Off-state". The state "0: On-state (normal mode)" is a state where all the function blocks of the communication device 100 are in operation, and indicates that, for example, the communication device 100 is being operated by a user. The state "1: On-state (energy-saving mode)" is a state where some of the function blocks are in operation, and corresponds to, for example, a standby mode in which the communication device 100 is maintained powered up but is not being operated by a user. In this state, the access point function of the close range wireless communication unit 108, described below, is not started. The state "2: Off-state" is a state where the communication device 100 stays powered off. The start-up availability state is information indicating whether or not the communication device 100 is ready to enter from the "2: Off-state" state to the "0: On-state (normal mode)" or "1: On-state (energy-saving mode)" state, and is either "0: Available" or "1: Not available". The start-up availability state is information which is valid only when the power supply start-up state is "2: Off-state". For example, if the communication device 100, which is battery driven, has no battery remaining and the power supply start-up state is "2: Off-state", the start-up availability state is "1: Not available". The above power supply start-up states are examples of a plurality of operation modes.

The read and write operation of the tag memory 110 described above may be performed using the control unit 101 and also using an external device having the NFC reader/writer function via close proximity wireless communication. In the case of close proximity wireless communication with an external device, control is executed by using the electric power generated by electromagnetic induction when radio waves supplied from the external device are received. Therefore, the read and write operation may be performed using an external device even while the communication device 100 is in a power-off state.

Referring back to FIG. 1, the close range wireless communication unit 108 is a processing block configured to perform wireless LAN communication based on the Institute of Electrical and Electronics Engineers (IEEE) 802.11 protocol, which is longer range communication than the communication performed by the close proximity wireless communication unit 107. The close range wireless communication unit 108 includes a baseband/media access control (MAC) controller circuit, a radio-frequency (RF) module, an antenna, and so forth. The close range wireless communication unit 108 has an access point function to self-configure a wireless LAN network, and receives a wireless LAN connection request from an external device having a station function. The close range wireless communication unit 108 may not necessarily be a wireless LAN communication unit, and may be based on, for example, Bluetooth (registered trademark).

The power supply control unit 111 is a block configured to control the supply of battery power to the entirety of the communication device 100, and is controlled using the control unit 101, the operation unit 105, and the close proximity wireless communication unit 107. Specifically, if the remaining battery level is lower than a certain threshold value, power-off processing is executed by the control unit 101. If power supply processing is executed by the user operating a power supply button, control is executed in accordance with an input signal from the operation unit 105. If power-on processing is executed using an external device via close proximity wireless communication based on the NFC protocol, control is executed in accordance with a signal from the close proximity wireless communication unit 107.

Configuration of Information Terminal

Figure 3:
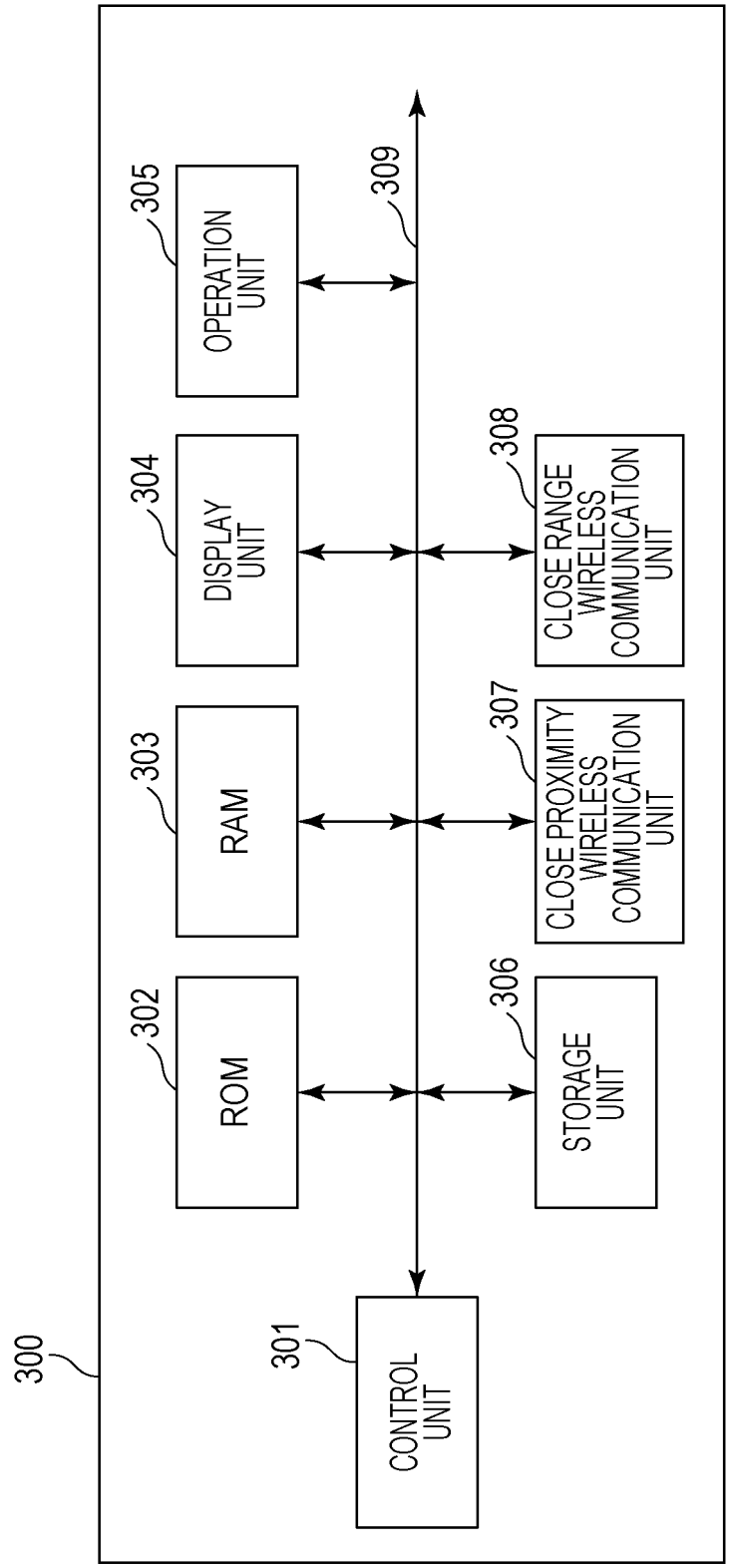
FIG. 3 is a diagram illustrating an example of an internal configuration of an information terminal according to the first exemplary embodiment of the present invention.

FIG. 3 is a processing block diagram illustrating an internal configuration of an information terminal 300, which is an example of an information terminal according to an exemplary embodiment of the present invention. Examples of the information terminal may include a mobile phone, a digital camera, a music player, a tablet terminal, and a personal computer. As illustrated in FIG. 3, the information terminal 300 includes a control unit 301, a ROM 302, a RAM 303, a display unit 304, an operation unit 305, a storage unit 306, a close proximity wireless communication unit 307, and a close range wireless communication unit 308. The above components are connected to one another via an internal bus 309 serving as a data transmission path.

The control unit 301 is a processing block configured to control the overall operation of the information terminal 300, and is formed of, for example, a CPU. The control unit 301 executes a program stored in the ROM 302, thereby implementing various functions.

The ROM 302 is a non-volatile memory, and is a memory configured to store data and a processing program to be executed by the control unit 301.

The RAM 303 is a volatile memory, and is used as a working memory for the control unit 301 or as a temporary data storage area.

The display unit 304 is a processing block configured to display and output information to a user, and may be formed of, similarly to the display unit 104 of the communication device 100, for example, a liquid crystal panel, an organic EL panel, or the like.

The operation unit 305 is a processing block configured to receive an instruction input from the user, and may include, similarly to the display unit 104 of the communication device 100, buttons, a cross key, a touch panel, and so forth.

The storage unit 306 is a processing block configured to store and read information in and from a large-capacity recording medium such as a built-in hard disk, a built-in flash memory, or a removable memory card.

The close proximity wireless communication unit 307 is a processing block configured to perform close proximity wireless communication based on the NFC protocol. The close proximity wireless communication unit 307 includes a resonant circuit including an inductor and a capacitor, a demodulation circuit configured to demodulate a signal received by the resonant circuit, a transmission circuit configured to amplify the carrier and transmit the amplified carrier from the resonant circuit, and so forth. The close proximity wireless communication unit 307 has an NFC reader/writer function to implement a function to read information from an external device having an NFC card function. This function is an example of an information reception unit.

The close range wireless communication unit 308 is a processing block configured to perform wireless LAN communication based on the IEEE 802.11 protocol. The close range wireless communication unit 308 includes a baseband/MAC controller circuit, an RF module, an antenna, and so forth. The close range wireless communication unit 308 has a station function to connect to a wireless LAN network configured by an access point.

Network System Configuration

Figure 4:
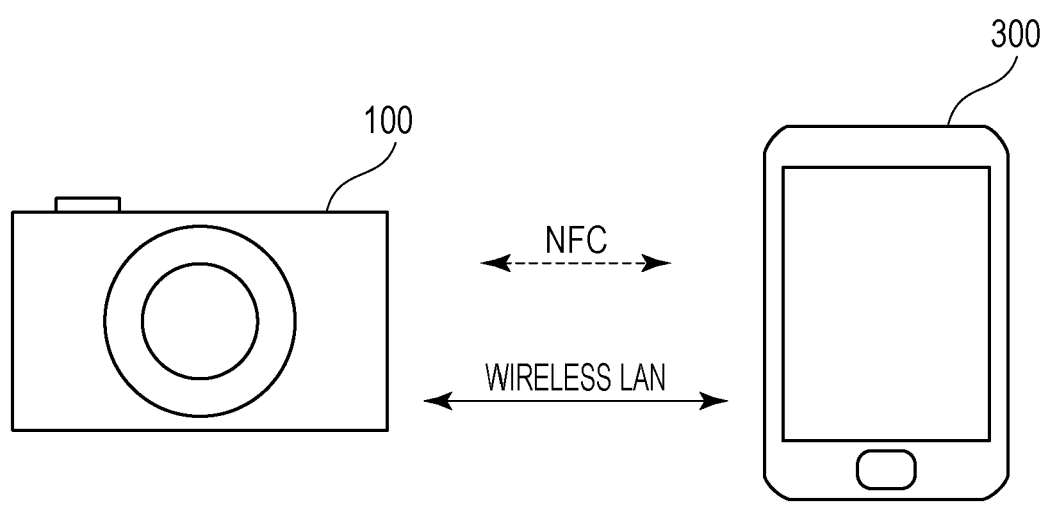
FIG. 4 is a diagram illustrating an example of a network system configuration according to the first exemplary embodiment of the present invention.
Figure 15:
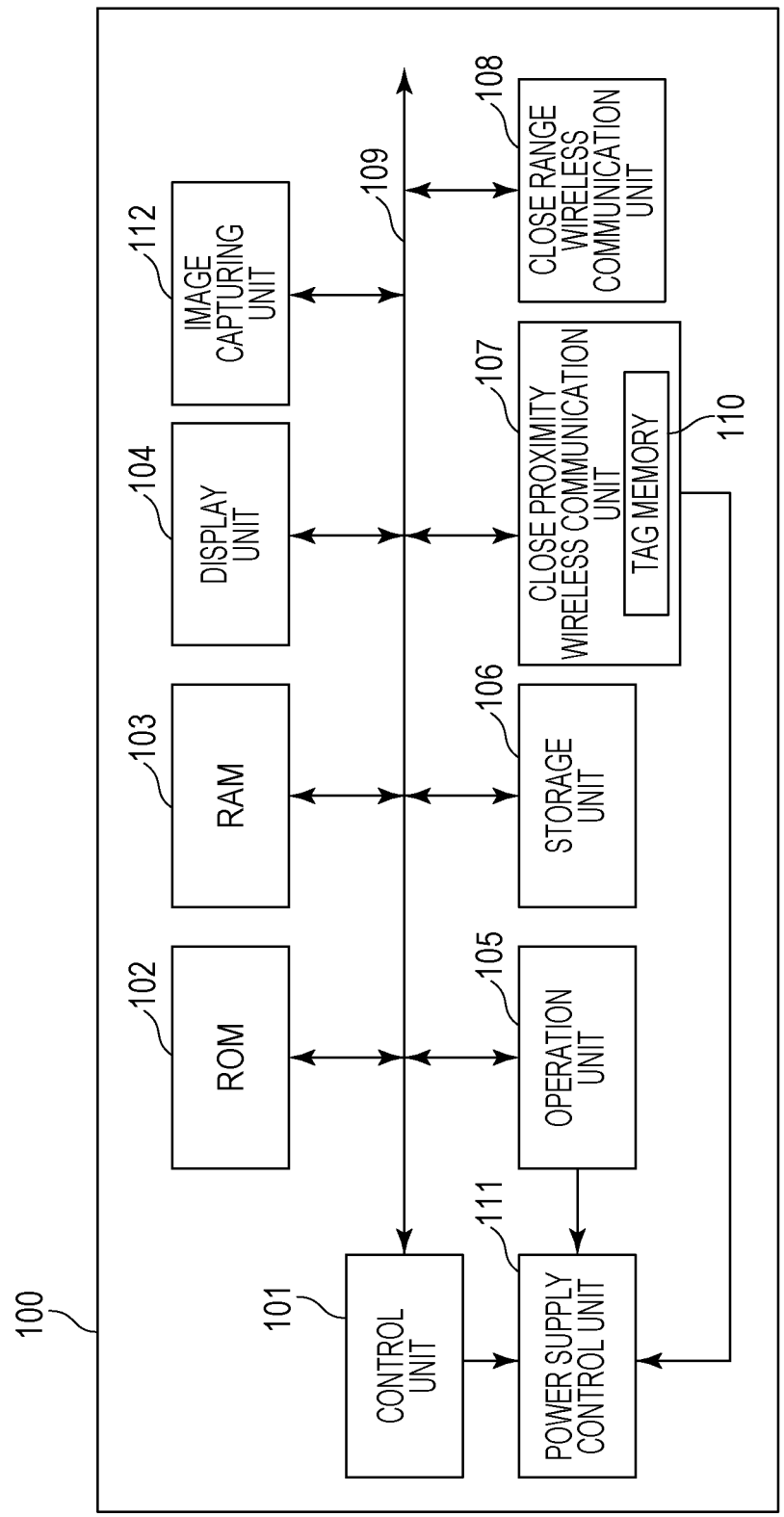
FIG. 15 is a diagram illustrating another example of the internal configuration of the communication device according to the first exemplary embodiment of the present invention.
Figure 16:
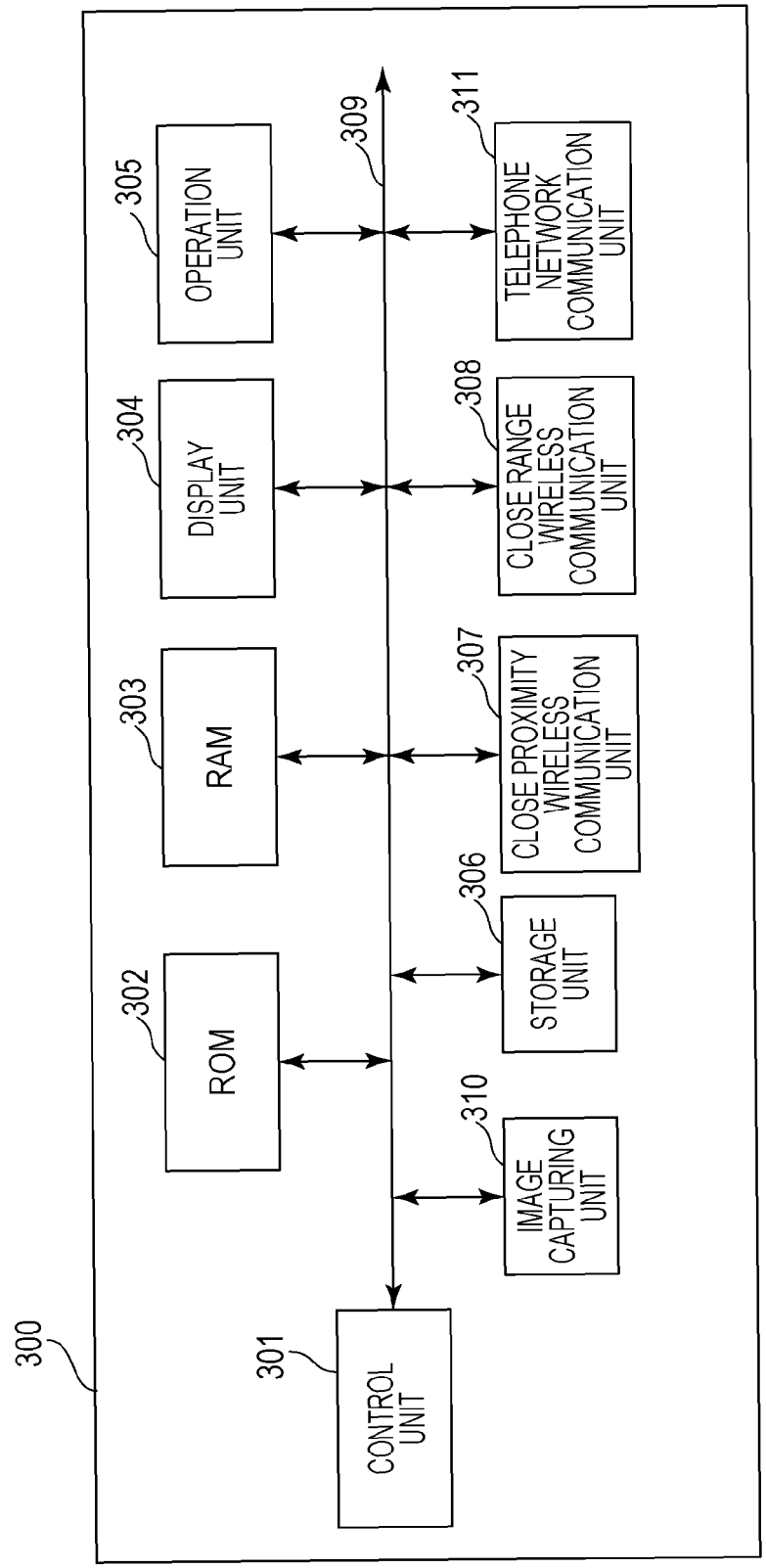
FIG. 16 is a diagram illustrating another example of the internal configuration of the information terminal according to the first exemplary embodiment of the present invention.

FIG. 4 is a diagram schematically illustrating an example of a network system according to this exemplary embodiment. In this exemplary embodiment, a description will be given of a system in which wireless communication connection is established between a communication device and an information terminal, where, by way of example, the communication device is a digital camera and the information terminal is a mobile phone. As illustrated in FIG. 4, a network system includes the communication device 100 and the information terminal 300, and the communication device 100 and the information terminal 300 are configured to communicate with each other via close proximity wireless communication based on the NFC protocol. The close proximity wireless communication based on the NFC protocol is an example of a first wireless communication protocol. The communication device 100 and the information terminal 300 are also configured to communicate with each other via close range wireless communication based on the wireless LAN protocol. The close range wireless communication based on the wireless LAN protocol is an example of a second wireless communication protocol. In this case, the communication device 100 described with reference to FIG. 1 further includes an image capturing unit 112 (see FIG. 15). The image capturing unit 112 converts object light focused by a lens into an electrical signal, performs processing such as noise reduction, and outputs digital data as image data. The information terminal 300 described with reference to FIG. 3 further includes an image capturing unit 310 and a telephone network communication unit 311 for accessing a mobile phone network (FIG. 16).

As described above, in the NFC protocol, communication is executed in such a way that the information terminal 300 having a reader/writer function reads information stored in the tag memory 110 of the communication device 100 having a card function.

In the wireless LAN protocol, by contrast, the communication device 100 has an access point function, and communication is executed in such a way that the information terminal 300 having a station function connects to a wireless LAN network configured by the communication device 100 in an infrastructure mode.

In FIG. 4, a digital camera is used as a communication device and a smartphone is used as an information terminal, by way of example. This example does not limit a system configuration to which the present invention is applicable.

The flow of an existing handover process, which is executed in the network configuration illustrated in FIG. 4, will now be briefly described with reference to FIG. 5. The following description is based on the assumption that the power of the communication device 100 and the information terminal 300 stay powered on.

Figure 5:
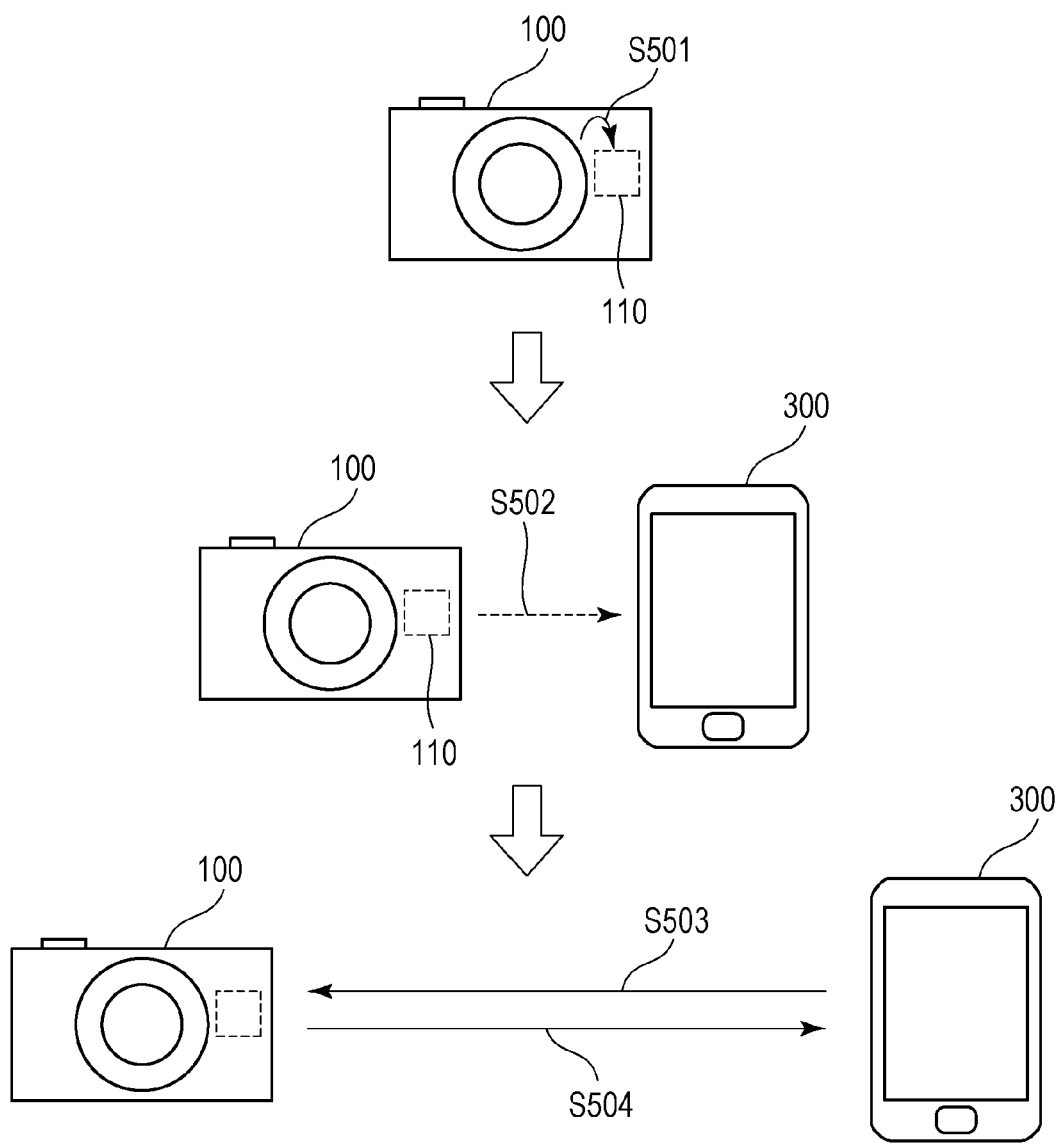
FIG. 5 is a diagram illustrating the flow of an existing handover process.

As illustrated in the upper portion of FIG. 5, before the initiation of a handover, wireless LAN parameter information (SSID, encryption key) for connecting to a wireless LAN network configured by using the access point function of the communication device 100 is stored in the tag memory 110 (S501). The processing of S501 may be performed through an input operation performed by the user using the operation unit 105, or may be automatically performed by means of the control unit 101 of the communication device 100.

After the above operation has been performed, when the user brings the information terminal 300 into close proximity to the communication device 100, NFC-based close proximity wireless communication is executed, and the wireless LAN parameter information stored in the tag memory 110 is transmitted to the information terminal 300 (S502). Then, the information terminal 300 transmits a communication connection request to the wireless LAN network associated with the SSID included in the wireless LAN parameter information received in S501 (S503).

Thereafter, upon receiving the communication connection request, the communication device 100 transmits a response indicating permission of the request to the information terminal 300 (S504). Accordingly, wireless LAN communication connection is established between the communication device 100 and the information terminal 300. Through the thus established wireless LAN communication, for example, image data obtained by capturing an image using a digital camera can be transmitted to a mobile phone. Alternatively, through the wireless LAN communication, image data obtained by capturing an image using a mobile phone can be transmitted to a digital camera. The image data to be transmitted and received may be selected by the device on the transmitter side or may be selected by the device on the receiver side.

The flow of the existing handover process has been described. This procedure may eliminate the need for user input of parameters for establishing wireless LAN communication connection, and facilitate the setup of an environment where image data can be exchanged via wireless LAN communication. Here, data to be exchanged via wireless LAN communication is image data, by way of example, for ease of description. However, this is merely an example. For example, data to be exchanged via wireless LAN communication may be moving image data or audio data. Note that NFC-based close proximity wireless communication has a lower communication speed than wireless LAN communication. For this reason, in this exemplary embodiment, it is basically assumed that image data itself is transmitted and received via wireless LAN communication. However, comparatively small size data such as metadata attached to the image data and thumbnails may be transmitted and received via NFC-based close proximity wireless communication.

A description has been given of the configuration of the communication device 100 and the information terminal 300 and the network system configuration according to this exemplary embodiment. A handover process according to the present invention in the above-described configuration will now be described with reference to the drawings.

Information Storage Process for Tag Memory 110

First, a process for storing information in the tag memory 110 of the communication device 100 according to this exemplary embodiment will be described with reference to FIG. 6. This process is an example of a process performed by a storage unit.

The process is based on the assumption that wireless LAN parameter information (SSID, encryption key) for connecting to a wireless LAN network configured by using the access point function of the close range wireless communication unit 108 is stored in the tag memory 110 in advance.

Figure 6:
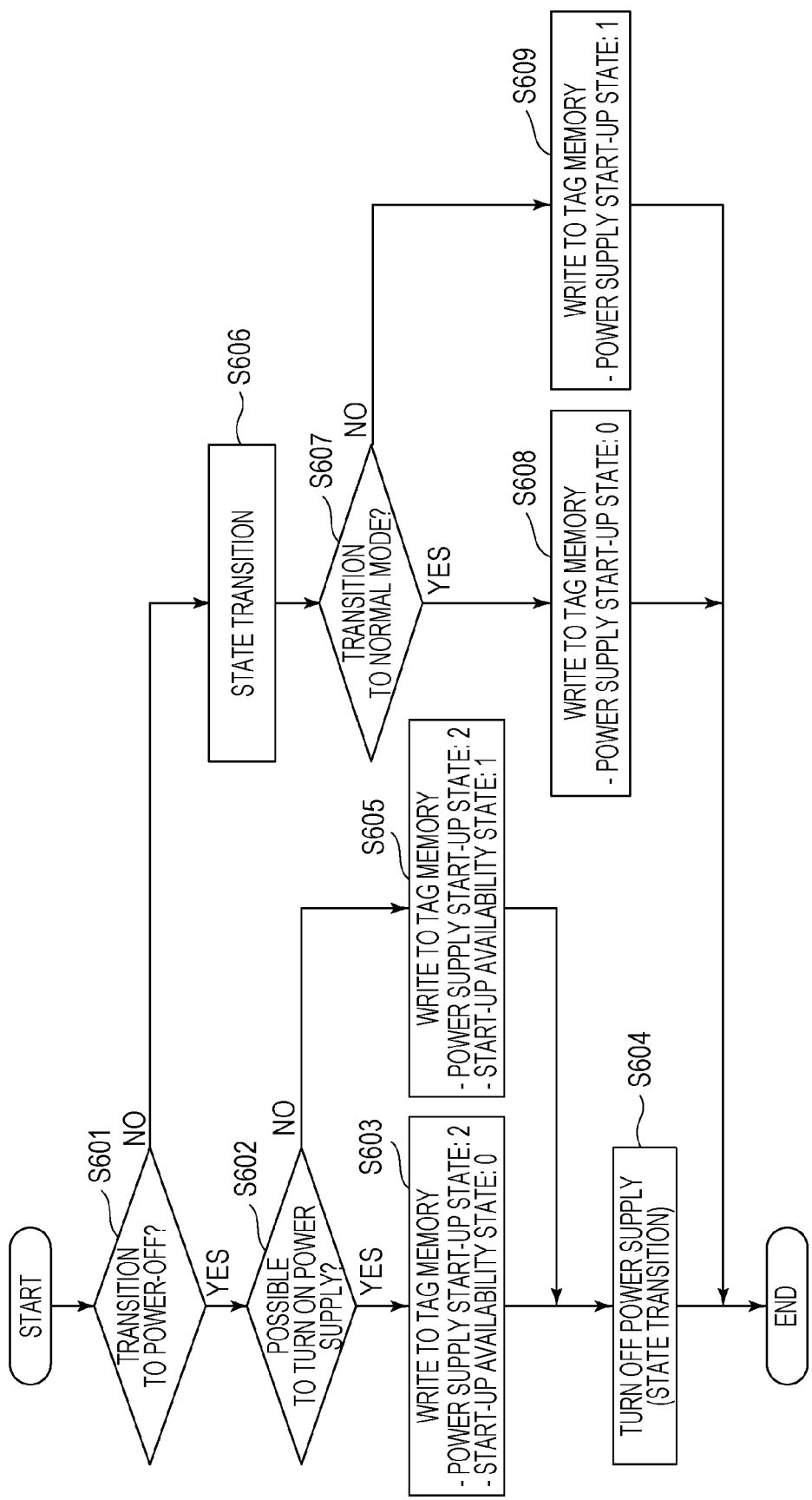
FIG. 6 is a diagram illustrating the flow of a process for storing information in the tag memory according to the first exemplary embodiment of the present invention.

The processing flow illustrated in FIG. 6 is executed at the time when the power supply start-up state of the communication device 100 is changed. As described above, in this exemplary embodiment, the power supply start-up state is any of "0: On-state (normal mode)", "1: On-state (energy-saving mode)", and "2: Off-state". The illustrated process starts when, for example, the power of the communication device 100 is turned on or, conversely, the power of the communication device 100 is turned off in accordance with a user operation. The illustrated process is also executed when, in the power-on state, the mode is changed from the normal mode to the energy-saving mode.

In S601, the control unit 101 determines whether the change of the power supply start-up state indicates that the power of the communication device 100 is turned off. If the determination is YES, the process proceeds to S602. If the determination is NO, the process proceeds to S606. The determination may be YES when, for example, a transition to "2: Off-state" has occurred in response to a power-off operation performed by the user or when an automatic transition to "2: Off-state" has occurred since the remaining battery level is less than a certain threshold value. The determination may be NO when, for example, a transition to "0: On-state (normal mode)" has occurred in response to a power-on operation performed by the user. Other examples include a case where a transition to "1: On-state (energy-saving mode)" has occurred since no user operation has been performed for a certain period of time, and a case where a transition to "0: On-state (normal mode)" has occurred in response to a user operation performed in the energy-saving mode.

In S602, the control unit 101 determines whether it is possible to turn on the power of the communication device 100 after the communication device 100 has entered the power-off state. This determination process is based on the remaining battery level of the communication device 100. If the determination is YES, the process proceeds to S603. If the determination is NO, the process proceeds to S605. For example, in a case where an automatic transition to "2: Off-state" has occurred since the remaining battery level is less than a certain threshold value, the determination is NO.

In S603, the control unit 101 updates the information concerning the power supply start-up state and start-up availability state in the tag memory 110. In S603, the power supply start-up state is set to "2: Off-state" and the start-up availability state is set to "0: Available".

In S604, the control unit 101 turns off the power supply to the communication device 100. Then, the process ends.

If NO is determined in S602, in S605, the control unit 101 updates the information concerning the power supply start-up state and start-up availability state in the tag memory 110. In S605, the power supply start-up state is set to "2: Off-state" and the start-up availability state is set to "1: Not available".

If NO is determined in S601, then in S606, the control unit 101 executes a transition to a specified power supply start-up state.

In S607, the control unit 101 determines whether the change of the power supply start-up state indicates a transition to the power-on state in the normal mode or a transition to the power-on state in the energy-saving mode. If a transition to the normal mode is determined (YES), the process proceeds to S608. If a transition to the energy-saving mode is determined (NO), the process proceeds to S609.

In S608, the control unit 101 updates the information concerning the power supply start-up state in the tag memory 110. In S608, the power supply start-up state is set to "0: On-state (normal mode)".

In S609, the control unit 101 updates the information concerning the power supply start-up state in the tag memory 110. In S609, the power supply start-up state is set to "1: On-state (energy-saving mode)".

The information storage process for the tag memory 110 has been described.

As described above, the description is based on the assumption that wireless LAN parameter information (SSID, encryption key) is stored in the tag memory 110 in advance. For example, fixed wireless LAN parameter information may instead be written to the tag memory 110 before factory shipment. Alternatively, a setting menu screen may be displayed on the display unit 104, and the wireless LAN parameter information in the tag memory 110 may be updated at the time when the network settings for the wireless LAN are changed in accordance with an input operation performed by the user using the operation unit 105.

Handover Process

The details of the handover process executed between the communication device 100 and the information terminal 300 according to this exemplary embodiment will now be described with reference to the drawings.

Herein, in a typical processing sequence according to the present invention, by way of example, the power supply start-up state of the communication device 100 is "2: Off-state", and the start-up availability state of the communication device 100 is "0: Available". A processing sequence to be performed when the handover process is initiated in the above conditions will be described with reference to FIG. 7. An example of the other power supply start-up states and start-up availability states will be described below.

In S701, the control unit 301 of the information terminal 300 enables the NFC reader/writer function in accordance with a user operation. The NFC reader/writer function may be enabled by, for example, the pressing of a certain button of the operation unit 305.

Figure 7:
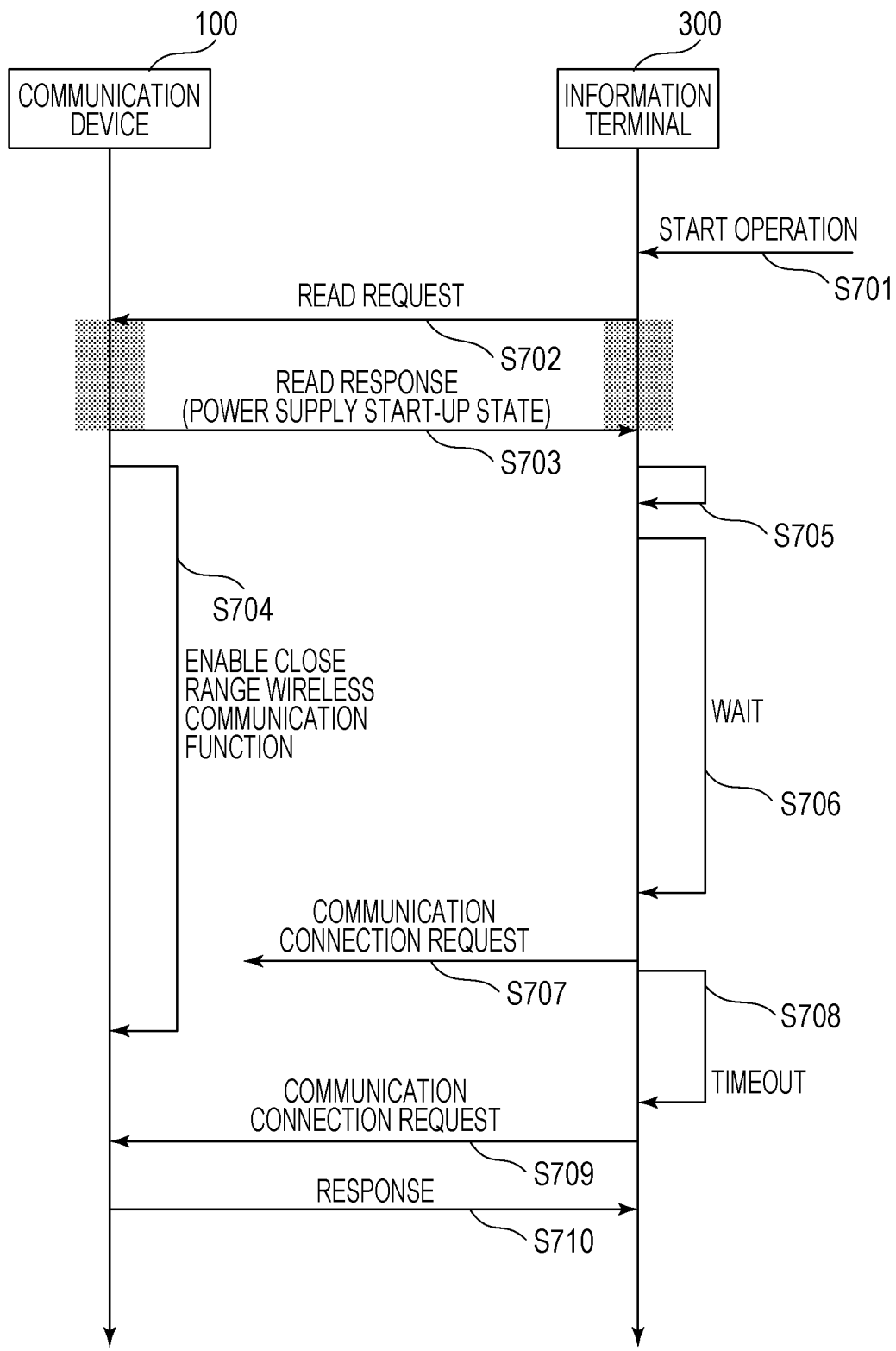
FIG. 7 is a diagram illustrating a processing sequence of a handover process according to the first exemplary embodiment of the present invention.

In S702, the control unit 301 of the information terminal 300 transmits a read request signal by using the reader/writer function of the close proximity wireless communication unit 307. The processing of S702 is executed in response to the information terminal 300 and the communication device 100 being brought into close proximity within the communication range for NFC communication by the user. The communication range of the NFC protocol is a range with a close distance of approximately 10 cm. For example, a screen for prompting the user to bring the information terminal 300 into close proximity to the communication device 100 (or to cause the information terminal 300 to touch the communication device 100) is displayed on the display unit 304 of the information terminal 300. When the user causes the information terminal 300 to touch the communication device 100, a read request signal transmitted from the close proximity wireless communication unit 307 arrives at the close proximity wireless communication unit 107 of the communication device 100. In FIG. 7, shaded areas on the vertical axes indicate that the respective devices are in close proximity within the communication range for NFC communication. The read request is an example of an information acquisition request.

In S703, the close proximity wireless communication unit 107 of the communication device 100 reads information stored in the tag memory 110, and transmits the read information to the information terminal 300 as a response signal to the read request signal. The information to be transmitted here includes wireless LAN parameter information (SSID, encryption key) for connecting to a wireless LAN network configured by using the access point function of the close range wireless communication unit 108 of the communication device 100. The information also includes the information concerning the power supply start-up state ("2: Off-state") and the start-up availability state ("0: Available"). The processing of S703 is executed while the communication device 100 is in a power-off state. The close proximity wireless communication unit 107 of the communication device 100 executes processing by using the electric power generated by electromagnetic induction when receiving radio waves supplied from the close proximity wireless communication unit 307 of the information terminal 300.

After S703, the processing (S704) of the communication device 100 and the processing (S705) of the information terminal 300 are started in parallel.

In S704, the close proximity wireless communication unit 107 of the communication device 100 controls the power supply control unit 111 to enable the supply of battery power to the communication device 100 to start the overall system of the communication device 100. In addition to this, the close proximity wireless communication unit 107 requests the control unit 101 to enable the close range wireless communication unit 108. Upon receiving this request, the control unit 101 enables the access point function of the close range wireless communication unit 108. The processing of S704 is an example of a process performed by an enabling unit.

In S705, the control unit 301 of the information terminal 300 analyzes the information received in S703, and determines the transmission timing condition under which a communication connection request is transmitted by the close range wireless communication unit 308. Specifically, the control unit 301 refers to a determination table included in advance in the information terminal 300 on the basis of the acquired information concerning the start-up availability state and the power supply start-up state to determine whether or not a communication connection request is to be transmitted from the close range wireless communication unit 308 and to determine the transmission timing condition if a communication connection request is to be transmitted. The processing of S705 is an example of a process performed by a determination unit.

FIG. 8 illustrates an example of a determination table according to this exemplary embodiment. As illustrated in FIG. 8, the determination table contains information associated with the acquired information on the start-up availability state and the power supply start-up state, which includes availability of transmission of a communication connection request, a waiting period, and the number of retries. The availability of transmission indicates whether or not the information terminal 300 will transmit a communication connection request from the close range wireless communication unit 308 after S705. The waiting period indicates a waiting period from the time when the processing of S705 is performed to the time when the information terminal 300 transmits a communication connection request through the close range wireless communication unit 308. The number of retries indicates the maximum number of retransmission attempts of a communication connection request from the close range wireless communication unit 308. In the illustrated example of the processing sequence, since the power supply start-up state is "2: Off-state" and the start-up availability state is "0: Available", the transmission conditions of No. 3 are determined.

Referring back to FIG. 7, in S706, the control unit 301 of the information terminal 300 waits for a certain period of time in accordance with a waiting period condition in the transmission timing condition determined in S705. In a case where the station function of the close range wireless communication unit 308 is not enabled, the control unit 301 may start the station function.

In S707, the control unit 301 of the information terminal 300 controls the close range wireless communication unit 308 to transmit a communication connection request to the communication device 100 in order to connect to a wireless LAN network configured by using the access point function of the close range wireless communication unit 108 of the communication device 100. The processing of S707 corresponds to a connection request unit according to the present invention. In the illustrated example, the wireless LAN parameter information (SSID, encryption key) acquired in S703 is used. Herein, as illustrated in FIG. 7, the access point function of the close range wireless communication unit 108 of the communication device 100 is still being started and is not yet enabled when the processing of S707 is executed. Thus, no response is made to the communication connection request transmitted in S707.

In S708, the control unit 301 of the information terminal 300 determines that a timeout has occurred because no response to the communication connection request transmitted in S707 is made from the communication device 100 for a certain period of time. The timeout period may be 500 ms, 1 sec, or the like.

In S709, the control unit 301 of the information terminal 300 re-transmits the communication connection request to the communication device 100 in accordance with a number-of-retries condition in the transmission timing condition determined in S705. Since the access point function of the close range wireless communication unit 108 of the communication device 100 is enabled at this time, the transmitted communication connection request is received by the communication device 100.

In S710, the control unit 101 of the communication device 100 determines that the wireless LAN parameter information (SSID, encryption key) transmitted in S709 is valid, and controls the close range wireless communication unit 108 to transmit a response indicating permission of the communication connection request to the information terminal 300. Accordingly, wireless LAN communication connection is established between the communication device 100 and the information terminal 300. The processing of S710 is an example of a process performed by a connection request response unit.

The details of the handover process executed between the communication device 100 and the information terminal 300 according to this exemplary embodiment have been described with reference to FIG. 7.

Figure 9:
FIG. 9 is a diagram illustrating an example of a failure notification screen according to the first exemplary embodiment of the present invention.

An example of the power supply start-up states and the start-up availability states other than those of No. 3 in FIG. 8 will now be described. In the example for No. 1, since all the function blocks of the communication device 100 are in operation and the duration of processing in step S704 is very short, the waiting period is 0 seconds (or a duration of several hundreds of milliseconds). Thus, the processing of S706 on the information terminal 300 side is omitted. In the example of No. 2, since the access point function of the close range wireless communication unit 108 needs to be started, the duration of processing in S704 is longer than for No. 1. However, the duration of processing in S704 is shorter than that for No. 3 where all the processing blocks need to be started. Thus, the waiting period (S706) is 3 seconds between the waiting periods for No. 1 and No. 3. In the example of No. 4, since the start up of the communication device 100 is not available, in S705, a screen indicating that the handover process has failed is presented to the user. Then, the handover process ends. The processing of S704 and the steps after S706 is not executed. FIG. 9 illustrates an example of the failure notification screen presented to the user on the display unit 304. An example of the power supply start-up states and the start-up availability states other than those for No. 3 has been described.

The exemplary embodiment described above enables the information terminal 300 to be controlled not to transmit a communication connection request for a wireless LAN as much as possible while the communication device 100 is starting the access point function of the close range wireless communication unit 108. In addition, in a case where the start up of the communication device 100 is not possible, the information terminal 300 may be controlled not to transmit a communication connection request for a wireless LAN. Accordingly, the information terminal 300 may execute transmission control of a communication connection request for a wireless LAN at an optimum time in the handover process.

In this exemplary embodiment, in order to turn on the power of the communication device 100 that is in a power-off state via close proximity wireless communication based on the NFC protocol, the tag memory 110 whose read and write operation is enabled only by the electric power of the information terminal 300 is included in the communication device 100. However, the tag memory 110 is not essential to the present invention. In a case where the power supply start-up state of the communication device 100, which is in the energy-saving mode, is changed to the normal mode via close proximity wireless communication based on the NFC protocol, the close proximity wireless communication unit 107 of the communication device 100 may merely have an NFC card emulation function and the control unit 101 stores an SSID, an encryption key, a power supply start-up state, and a start-up availability state, instead of the tag memory 110 and responds to access from the communication device 100. Alternatively, both the communication device 100 and the information terminal 300 may have an NFC peer-to-peer (P2P) function and the control unit 101 stores an SSID, an encryption key, a power supply start-up state, and a start-up availability state, instead of the tag memory 110 and responds to access from the communication device 100.

Second Exemplary Embodiment

A second exemplary embodiment of the present invention will now be described.

In the first exemplary embodiment, by way of example, the communication device 100 stores wireless LAN parameter information (SSID, encryption key) and information concerning the power supply start-up state and the start-up availability state in the tag memory 110. In this exemplary embodiment, start-up period information (4 bytes) is further stored, and the information terminal 300 determines the transmission condition for a communication connection request for close range wireless communication in accordance with the stored start-up period information.

Components having substantially the same functional configurations as those in the first exemplary embodiment are assigned the same numerals to avoid redundant description, and characteristic portions of the second exemplary embodiment will be described in detail.

The internal configuration of the communication device 100 and the information terminal 300 and the network system configuration according to this exemplary embodiment are similar to those in the first exemplary embodiment, and a description thereof is thus omitted.

Data Format of Tag Memory 110

Figure 10:
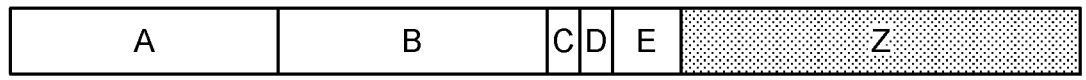
FIG. 10 is a diagram illustrating an example of the data format of a tag memory according to a second exemplary embodiment of the present invention.

FIG. 10 illustrates an example of the data format of the tag memory 110 according to this exemplary embodiment. As illustrated in FIG. 10, the tag memory 110 has a total capacity of 64 bytes, and is configured to store information concerning an SSID (16 bytes), an encryption key (16 bytes), a power supply start-up state (1 byte), a start-up availability state (1 byte), and a start-up period (4 bytes). The SSID, the encryption key, the power supply start-up state, and the start-up availability state have been described in the first exemplary embodiment. The start-up period is information concerning the time period from the time when information in the tag memory 110 is transmitted to an external device via close proximity wireless communication to the time when the close range wireless communication unit 108 is enabled (or is ready to make a response). The start-up period corresponds to the time period required in S704 in the sequence diagram illustrated in FIG. 7.

Information Storage Process for Tag Memory 110

Figure 11:
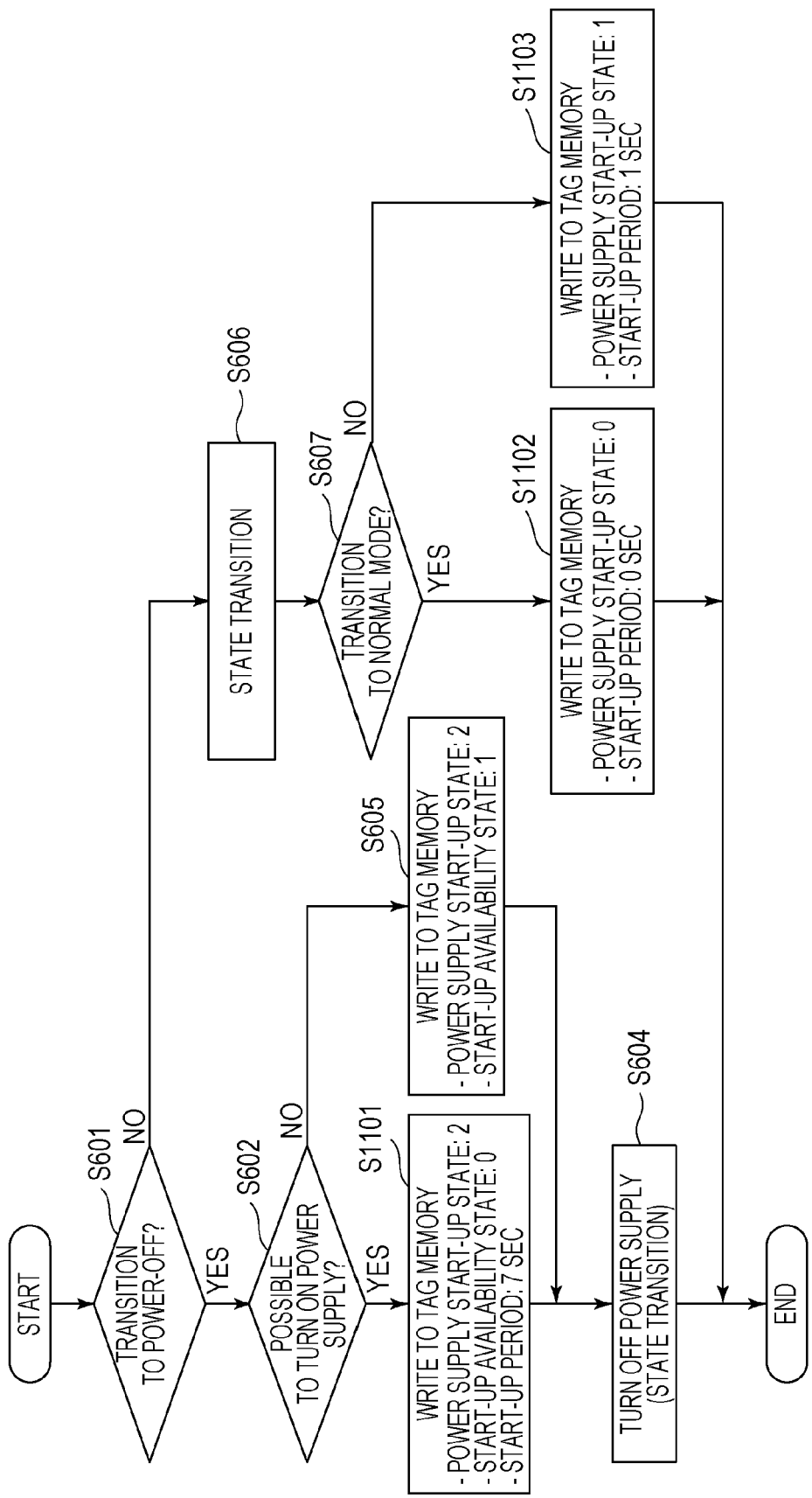
FIG. 11 is a diagram illustrating the flow of a process for storing information in the tag memory according to the second exemplary embodiment of the present invention.

A process for storing information in the tag memory 110 of the communication device 100 according to this exemplary embodiment will now be described with reference to FIG. 11. The following description will be given of only processing steps different from those in the storage process according to the first exemplary embodiment illustrated in FIG. 6.

In S1101, the control unit 101 updates the information concerning the power supply start-up state, start-up availability state, and start-up period in the tag memory 110. In S1101, the power supply start-up state is set to "2: Off-state", the start-up availability state is set to "0: Available", and the start-up period is set to "7 seconds".

In S1102, the control unit 101 updates the information concerning the power supply start-up state and start-up period in the tag memory 110. In S1102, the power supply start-up state is set to "0: On-state (normal mode)" and the start-up period is set to "0 seconds".

In S1103, the control unit 101 updates the information concerning the power supply start-up state and start-up period in the tag memory 110. In S1103, the power supply start-up state is set to "1: On-state (energy-saving mode)" and the start-up period is set to "1 second".

The information storage process for the tag memory 110 according to this exemplary embodiment has been described.

Handover Process

Figure 12:
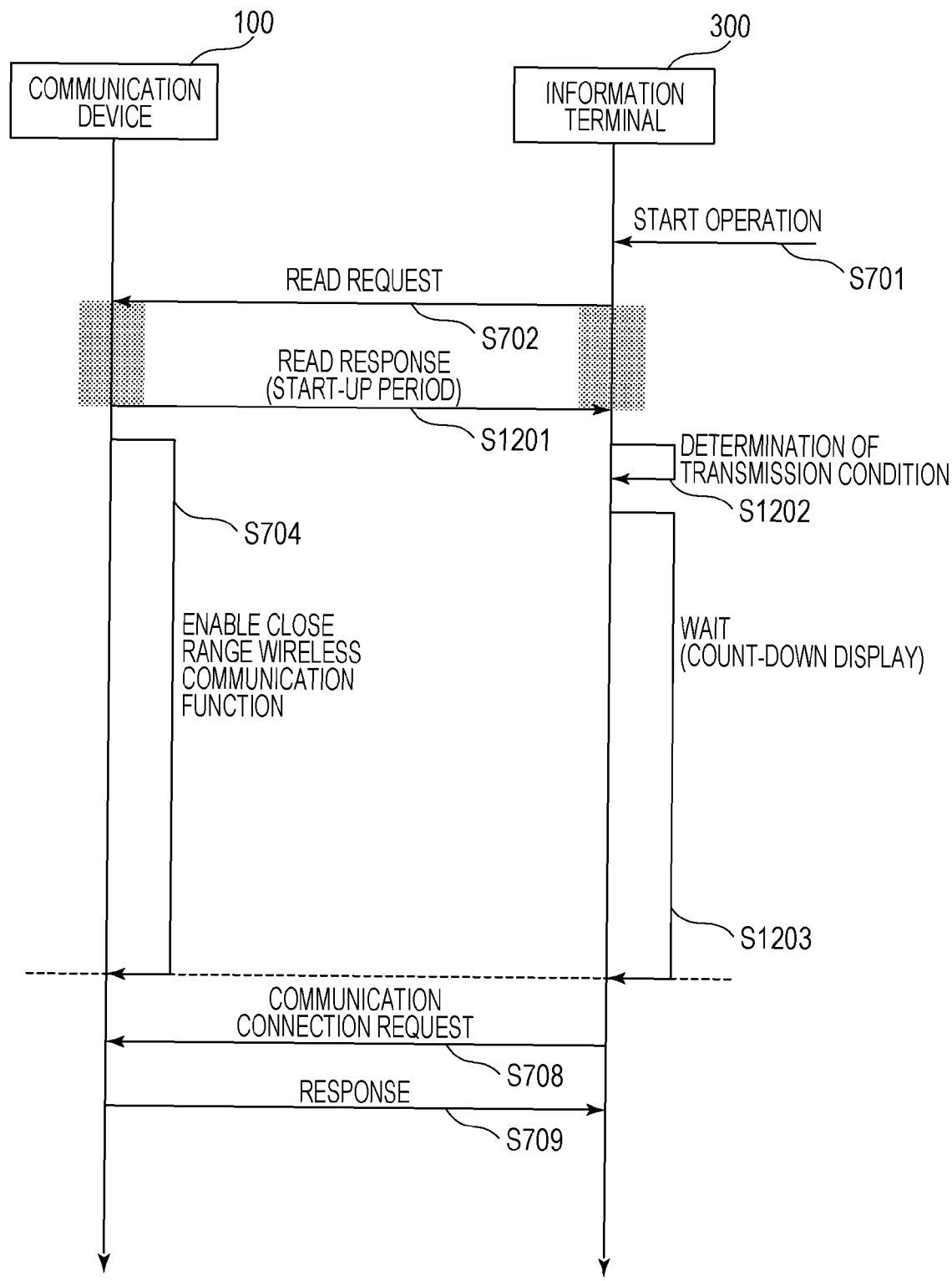
FIG. 12 is a diagram illustrating a processing sequence of a handover process according to the second exemplary embodiment of the present invention.

The details of the handover process executed between the communication device 100 and the information terminal 300 according to this exemplary embodiment will now be described with reference to FIG. 12. The following description will be given of only processing steps different from those in the handover process according to the first exemplary embodiment illustrated in FIG. 7.

In S1201, the close proximity wireless communication unit 107 of the communication device 100 reads information stored in the tag memory 110, and transmits the read information to the information terminal 300 as a response signal to the read request signal. The information to be transmitted here includes wireless LAN parameter information (SSID, encryption key) for connecting to a wireless LAN network configured by using the access point function of the close range wireless communication unit 108 of the communication device 100. The information also includes the information concerning the power supply start-up state ("2: Off-state"), the information concerning the start-up availability state ("0: Available"), and the start-up period information ("7 seconds"). The processing of S1201 is executed while the communication device 100 is in a power-off state. The close proximity wireless communication unit 107 of the communication device 100 executes processing by using the electric power generated by electromagnetic induction when receiving radio waves supplied from the close proximity wireless communication unit 307 of the information terminal 300.

After S1201, the processing (S704) of the communication device 100 and the processing (S1202) of the information terminal 300 are started in parallel.

In S1202, the control unit 301 of the information terminal 300 analyzes the information received in S1201, and determines the transmission timing condition under which a communication connection request is transmitted by the close range wireless communication unit 308. Specifically, the control unit 301 refers to a determination table included in advance in the information terminal 300 on the basis of the acquired information concerning the start-up availability state and the start-up period to determine whether or not a communication connection request is to be transmitted from the close range wireless communication unit 308 and to determine the transmission timing condition if a communication connection request is to be transmitted. FIG. 13 illustrates an example of the determination table according to this exemplary embodiment. As illustrated in FIG. 13, the determination table contains information associated with the acquired information concerning the start-up availability state and the start-up period, which includes availability of transmission of a communication connection request and a waiting period. The availability of transmission indicates whether or not the information terminal 300 will transmit a communication connection request from the close range wireless communication unit 308 after S1202. The waiting period indicates a waiting period from the time when the processing of S1202 is performed to the time when the information terminal 300 transmits a communication connection request through the close range wireless communication unit 308. In the illustrated example of the processing sequence, since the start-up availability state is "0: Available" and the start-up period is "7 seconds", the transmission conditions of No. 1 are determined, and the waiting period is determined to be "7 seconds".

Figure 14:
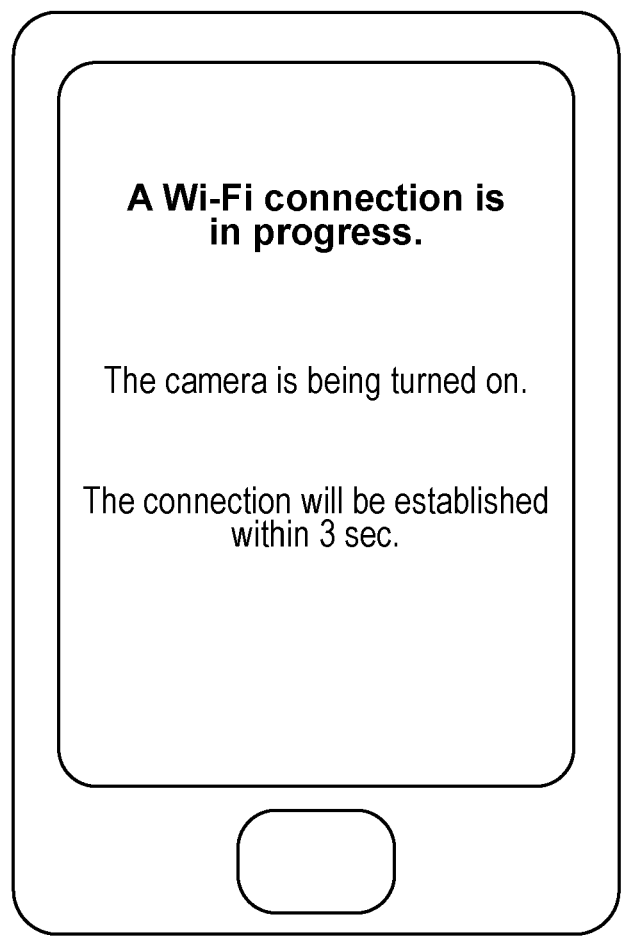
FIG. 14 is a diagram illustrating an example of a remaining time notification screen according to the second exemplary embodiment of the present invention.

In S1203, the control unit 301 of the information terminal 300 waits for a certain period of time in accordance with a waiting period condition in the transmission timing condition determined in S1202. In a case where the station function of the close range wireless communication unit 308 is not enabled, the control unit 301 may start the station function. In addition, an indication of start up from the power-off state and the remaining waiting period may be displayed on the display unit 304 to notify the user of the time when communication connection based on a wireless LAN will be established. FIG. 14 illustrates an example of the remaining time notification screen displayed on the display unit 304. The control unit 301 of the information terminal 300 may count down the remaining time on the screen and notify the user of the remaining time in real time.

The details of the handover process executed between the communication device 100 and the information terminal 300 according to this exemplary embodiment have been described with reference to FIG. 12.

The exemplary embodiment described above enables the information terminal 300 to be controlled to transmit a communication connection request for a wireless LAN in accordance with the time when the communication device 100 completes the start up of the access point function of the close range wireless communication unit 108. In addition, a user may also be notified of the remaining time of the waiting period. Accordingly, the information terminal 300 may execute transmission control of a communication connection request for a wireless LAN at an optimum time in the handover process.

According to the present invention, a procedure for establishing communication may be performed at an appropriate time.

Other Embodiments

In the foregoing exemplary embodiments, a description has been given of an example in which the start time of the transmission of a connection request is delayed and the number of retries of a connection request is increased to extend the time taken for the information terminal 300 to determine that connection with the communication device 100 is not possible, thereby making the time required for the communication device 100 to complete the start up of the access point function. This is merely an example. For example, the timeout period may be changed based on the power supply start-up state and start-up availability state obtained from the communication device 100 via close proximity wireless communication. In this case, a table (FIG. 17) obtained by adding the timeout periods corresponding to the respective power supply start-up states and start-up availability states to the table illustrated in FIG. 8 is recorded in advance. The table illustrated in FIG. 17 may be referred to, thereby implementing appropriate setting of the timeout period.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-286682 filed Dec. 28, 2012, which is hereby incorporated by reference herein in its entirety.

What is claimed is:

1. An information processing apparatus, for communicating with a communication device using a first wireless communication protocol and a second wireless communication protocol different from the first wireless communication protocol, comprising:
a first wireless communication unit configured to use the first wireless communication protocol and configured to receive information, relating to a start-up state of the communication device, from the communication device using the first wireless communication protocol;
a second wireless communication unit configured to use the second wireless communication protocol; and
a control unit configured to control a sequence for establishing connection, using the second wireless communication unit and the second wireless communication protocol, with the communication device,
wherein, in the sequence for establishing the connection using the second wireless communication unit and the second wireless communication protocol, the control unit waits for a waiting period before transmitting a connection request, the waiting period being different according to a content of the received information relating to the start-up state of the communication device, and
wherein in a case where the second wireless communication unit is disabled when the information relating to the start-up state of the communication device is received, the control unit performs control to enable the second wireless communication unit without waiting for the waiting period.

2. The information processing apparatus according to claim 1, wherein the information, relating to the start-up state of the communication device, indicates whether or not the communication device can be returned from a power-off state to a power-on state at the time the information is received.

3. The information processing apparatus according to claim 1, wherein the information, relating to the start-up state of the communication device, indicates the time required for the communication device to reach a state in which it can perform communication using the second wireless communication protocol.

4. The information processing apparatus according to claim 1, wherein the information, relating to the start-up state of the communication device, indicates whether the communication device is in a power-on state or a power-off state.

5. The information processing apparatus according to claim 4, wherein the information, relating to the start-up state of the communication device, indicates whether the power-on state is a standby state or a normal state.

6. The information processing apparatus according to claim 5, wherein the first wireless communication unit is configured to initiate power-on processing in the communication device, in a case where the start-up state of the communication device is the power-off state or the standby state.

7. The information processing apparatus according to claim 6, wherein a request for establishment of the connection, using the second wireless communication protocol, with the second wireless communication unit is a request for participation in a network, based on the second wireless communication protocol, which is configured by the communication device.

8. The information processing apparatus according to claim 7, wherein the network is a wireless local area network.

9. The information processing apparatus according to claim 5, wherein the first wireless communication unit is configured to supply electric power to the communication device to cause the communication device to enter the power-on state using the electric power supplied from the first wireless communication unit.

10. The information processing apparatus according to claim 1,
wherein the first wireless communication unit is configured to supply electric power to the communication device.

11. The information processing apparatus according to claim 1, wherein the first wireless communication unit is arranged to target a shorter communication distance than the second wireless communication unit.

12. The information processing apparatus according to claim 1,
wherein the first wireless communication unit is configured to share parameters with the communication device, the parameters being used for establishing the communication with the communication device and wherein the control unit is configured to use the received parameters in the sequence for establishing the connection, using the second wireless communication unit and the second wireless communication protocol, with the communication device.

13. The information processing apparatus according to claim 1, wherein, in the sequence for establishing the connection using the second wireless communication unit and the second wireless communication protocol, the control unit is configured to change a waiting period for a response to the connection request, according to the content of the received information relating to the start-up state of the communication device.

14. The information processing apparatus according to claim 1, wherein in the sequence for establishing the connection using the second wireless communication unit and the second wireless communication protocol, the control unit is configured to perform control to retry transmitting the connection request in a case where no response to the connection request is received, and wherein the control unit is configured to change a number of retries according to the content of the received information relating to the start-up state of the communication device.

15. A control method for an information processing apparatus comprising a first wireless communication unit and a second wireless communication unit, for communicating with a communication device using a first wireless communication protocol and a second wireless communication protocol different from the first wireless communication protocol, comprising:

receiving information, relating to a start-up state of the communication device, from the communication device using the first wireless communication unit and the first wireless communication protocol; and executing a sequence for establishing connection, using the second wireless communication unit and the second wireless communication protocol, with the communication device, waiting for a waiting period before transmitting a connection request, in the sequence for establishing the connection using the second wireless communication unit and the second wireless communication protocol, the waiting period being different according to a content of the received information relating to the start-up state of the communication device, and enabling the second wireless communication unit without waiting for the waiting period in a case where the second wireless communication unit is disabled when the information relating to the start-up state of the communication device is received.

16. A computer-readable non-transitory recording medium storing a program which on execution by a programmable information processing apparatus comprising a first wireless communication unit and a second wireless communication unit causes the information processing apparatus, for communicating with a communication device using a first wireless communication protocol and a second wireless communication protocol different from the first wireless communication protocol, to implement a following method;

receiving information, relating to a start-up state of the communication device, from the communication device using the first wireless communication unit and the first wireless communication protocol; and executing a sequence for establishing connection, using the second wireless connection unit and the second wireless communication protocol, with the communication device, waiting for a waiting period before transmitting a connection request, in the sequence for establishing the connection using the second wireless communication unit and the second wireless communication protocol, the waiting period being different according to a content of the received information relating to the start-up state of the communication device, and enabling the second wireless communication unit without waiting for the waiting period in a case where the second wireless communication unit is disabled when the information relating to the start-up state of the communication device is received.

* * * * *